Jan. 30, 1968   P. M. LEMOIGNE   3,366,348
AIRCRAFT HIGH-LIFT WING
Filed Oct. 26, 1965   3 Sheets-Sheet 1
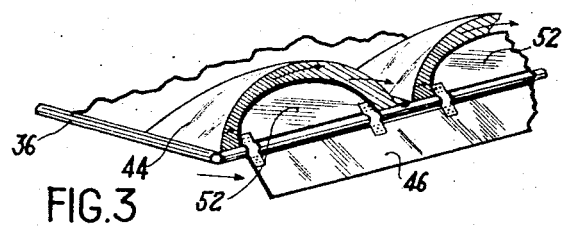
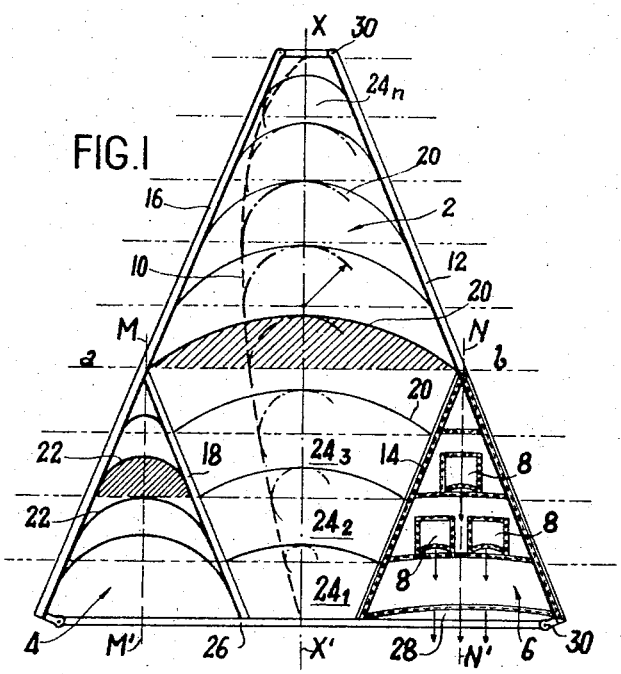
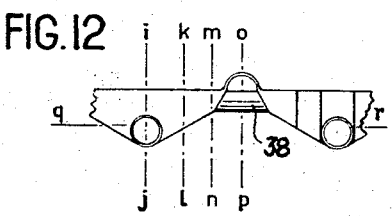

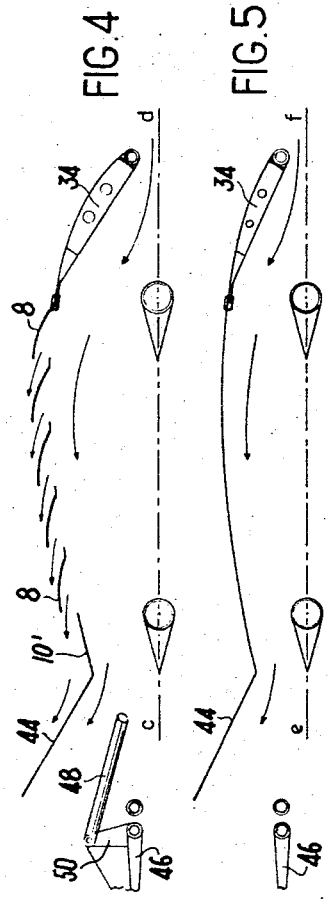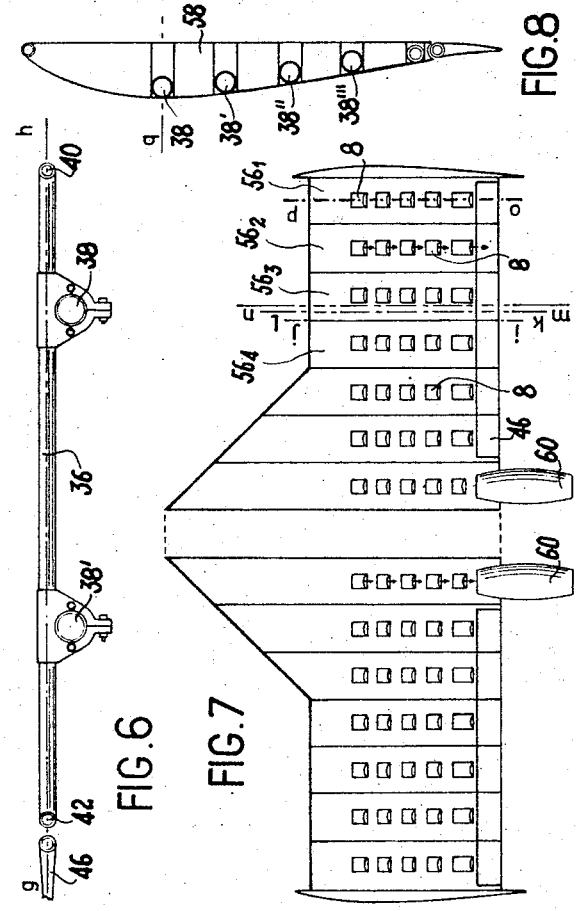

United States Patent Office 3,366,348
Patented Jan. 30, 1968

3,366,348
AIRCRAFT HIGH-LIFT WING
Pierre Marcel Lemoigne, 103 Ave. Verdier,
Montrouge, France
Filed Oct. 26, 1965, Ser. No. 505,281
Claims priority, application France, Nov. 23, 1964,
995,922
8 Claims. (Cl. 244—41)

ABSTRACT OF THE DISCLOSURE

This invention relates to an aeroplane wing which is divided into compartments containing ducts producing an air flow from the under surface to the upper surface of said wing for increasing the total lift of said wing and reducing the wing drag. The under surface of each compartment has an evolute concave aerodynamic profile and a hollow evolute transverse profile, the concavity of the profile being at a maximum at the central chord of the compartment and diminishing progressively towards the chords laterally bounding the said compartment.

---

The present invention relates to a high-lift aero-dynamic surface in particular an aeroplane wing and refers more particularly to an aerofoil at least the lower surface whereof is subdivided into a plurality of elementary surfaces having a hollow evolvent profile coacting with suction-discharging tubes or ducts.

It is known that the conventional aeroplane wing moving through the air has a pressure deficiency or under pressure on its upper surface and an excess pressure on its lower surface, the pressure deficiency being responsible for the major part of the areodynamic lift generated by the wing. It is also known however, that at the trailing edge, and more particularly at the actual rounding of the profile, the junction of the two airstreams at different pressure, coming from the lower and upper wing surfaces respectively, gives rise to very considerable vortices, which increase the drag of the wing.

The object of the present invention is to improve the lifting effect of the under surface and consequently increase the total lift of the wing; and equally, appreciably to reduce the turbulent flow at the trailing edge and consequently reduce the wing drag.

The present invention is an aeroplane wing which is divided in plan into a plurality of compartments of a simple geometrical form incorporating ducts or slots directed towards the rear and producing a flow of accelerated air from the under surface to the upper surface, at least the under surface of each of the said compartments having, in the direction parallel to the wing depth, an evolute, concave, aerodynamic profile the concavity whereof has a maximum at the central chord of the compartment and diminishes progressively towards the chords laterally bounding the said compartment, the said under surface of the wing having a hollow, evolute transverse profile in each compartment in the direction parallel to its span.

Preferably the aforesaid ducts or tubes are arranged in the regions of the wing where the camber of the profile is most marked, i.e. in the central region adjacent to the central chord of each compartment.

A wing in accordance with the present invention may have a thin profile or a thick profile, or even a thick section over part of the lift area, for instance in the vicinity of the leading edge, and a thin section in the central parts and those adjoining the trailing edge.

In the case of a thin wing, or one with a partially thin profile, the profile of the upper surface is identical in each compartment, with the profile of the lower surface, as defined precedingly.

In the case of a thick wing, the profile of the upper surface may be different from the profile of the under surface and for the upper surface a standard profile is preferentially selected, the generating lines whereof, substantially parallel to the wing span, are straight lines. In such case, the wing profile will have a variable thickness in each compartment, the least thickness being located next to the central chord of the said compartment. This latter arrangement permits installing of the spars and other structural elements of the wing within the thickness of the profile.

The stream lines of the airflow on the under side are guided by the curvature of this under surface parallel to the wing span towards the centre of the said compartment, where a part of this air stream is accelerated when passing through the ducts and supplies air at a high speed, to the upper air stream flowing off the upper wing surface.

It will thus be seen that by means of this "cellular subdivision" of the lower air stream flowing at high pressure over the under surface of the wing, the latter is rectified before rejoining the air stream at lower pressure flowing over the upper surface of the wing, in such manner that the major part of the parasitic vortices shedding at the wing tips and along the trailing edge, become suppressed. In addition, the accelerated airstream issuing from the ducts substantially tangentially to the upper surface and travelling backwards, prevents breakaway of the airflow at high angles of incidence and retards or inhibits the development of breakaway phenomena.

An embodiment of the present invention will now be described, by way of example, with reference to the accompanying drawings, in which:

FIG. 1 is a plan view of a thin wing profile of delta shape according to the invention;

FIG. 3 is a partial perspective view of the controls and ducts of the wing according to FIG. 2;

FIGS. 4, 5 and 6 are sectional views along the lines $cd$–$ef$–$gh$ of FIG. 2;

FIG. 7 is a plan view of another embodiment of a wing in accordance with the invention, having a thick profile of varying thickness;

FIGS. 8 to 11 are sectional views along the lines $ij$–$kl$–$mn$–$op$ of the wing according to FIG. 7;

FIG. 12 is a part sectional view along the line $qr$ of FIGS. 8 to 11.

Figure 2:
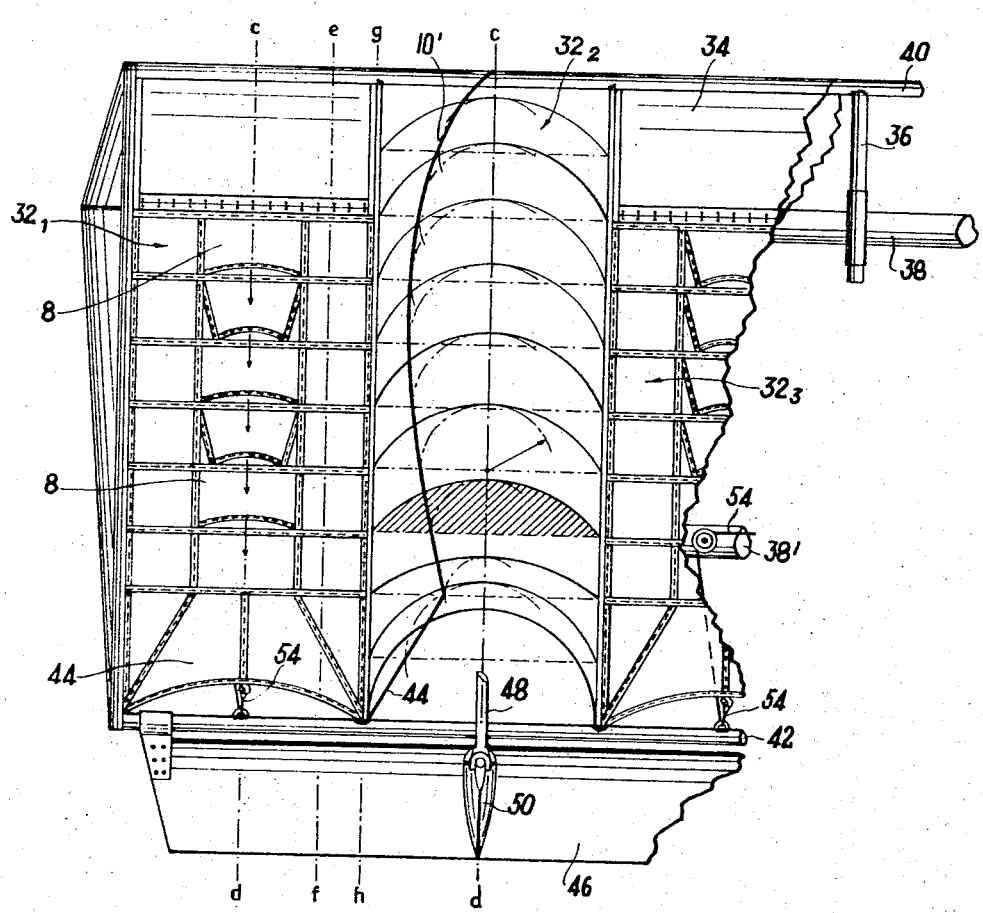
FIG. 2 is a partial plan view of a rectangular wing in accordance with the invention.

Referring to the drawings, FIG. 1 shows a wing of delta shape divided into a plurality of cells or compartments namely, a principal compartment 2, which is substantially lozenge-shaped, and two lateral compartments 4 and 6 which are of triangular shape. In this embodiment, the lifting surface is made of a thin and flexible or yielding material, for instance of a synthetic plastics or fabric sheet; such a wing being suitable for a flying body, whether a glider or power aircraft, of low speed. Each of the compartments is equipped with tubes or ducts 8 (only those in compartment 6 are shown), which are directed towards the rear and which provide an accelerated airflow from the lower surface (below the plane of the drawing) to the upper surface.

Each of these compartments has in the direction parallel to the wing depth i.e. in the direction parallel to the rolling axis XX′, a hollow aerodynamic profile of the kind shown turned down in the plane of FIG. 1 and represented by a broken line 10, for compartment 2. This profile is of evolvent form and its concavity, which is a maximum at the central chord of the compartment (XX′ for compartment 2, MM′ or NN′ for the compartments 4 and 6) proceeds diminishingly towards edges 12–14–16–18 bounding the said compartments.

The transverse profile of each compartment (i.e. in the direction parallel to the wing span) is consequently also an evolvent concave profile, shown turned down in the plane of the FIG. 1 at 20 and 22, for the compartments 2 and 4.

In the embodiment, as shown in FIG. 1, where the lifting surface is made of fabric, the hollow profile shape of each compartment is made by cutting out and assembling fabric panels $24_1$ $24_2$, $24_3$, $24_n$, forming the skin. The ducts 8 may also be made of fabric and are preferably arranged near the central chord of each compartment, to collect and accelerate the streamlines trapped in the bottom of the concavity of the wing surface.

The edges 12-14-16-18 of each compartment are formed of rectilinear components, e.g. tubes, making a peripheral frame with intermediate bracing, over which the skin is stretched. The rear wing spar may also be formed of a rectilinear tube or section bar; the trailing edge of the compartment(s) adjacent to this spar is attached thereto, as in the case of compartment 2, or, alternatively, is left free, as in the case of compartments 4 and 6, to allow of a certain amount of transverse curvature 28 in this part of the profile.

The frame may be stiffened by further ribs and can be made to fold, by means of hinges 30.

In accordance with the present embodiment, which is to a thin wing, the profile of the upper side is identical with that of the under side, and the evolvent profiles become straight lines at the edges 12-14-16-18 of the compartments.

FIG. 2 shows in plan, part of a rectangular wing according to a second embodiment of the invention. The wing is divided along the span, into a plurality of rectangular preferably identical compartments, $32_1$, $32_2$, $32_3$. . . .

In this embodiment the major part of the lifting surface is made of a thin material, as in the first embodiment but part 34 adjoining the leading edge (see FIG. 4 and 5) is a thick profile of conventional construction with ribs.

The profile 10' of the central chord c–d is the most concave; its contour without the duct, is shown in FIG. 2, and with the ducts 8, in the sectional view of FIG. 4.

The chord g–h separating two adjoining compartments is a straight line (FIG. 6) and consists of a rib 36 to which are attached spars 38–38', leading edge 40, and trailing edge 42.

As FIGS. 2–4 and 5 show, the profile 10' is terminated in a raised beak 44, which makes the profile autostable, and it is made of a fabric panel cut to form a divergent duct.

The total wing surface is divided into compartments such as will be hereinafter described, or only one or two compartments at the wing tips may be provided, to suppress marginal eddies; the central part of the wing (mid-wing section) being then of conventional construction.

The wing is fitted over the whole or part of its length in the vicinity of the trailing edge, with a flap 45, controlled as usual by rodding 48 leading to a lever 50. This flap has a balancing tab 52 (FIG. 3) in front of each compartment, which reduces the cross-section of the opening of a discharge hood 44 when the flap is lowered. Control wires 54 (FIG. 2) are also used to modify the airflow through the discharge hoods 44.

In the second embodiment, the profile of the upper surface of the wing is identical with that of the under surface over the whole principal part of the wing extending between the spar 38 and the trailing edge.

In a modification as shown in FIGS. 7 to 12, the profile of the upper surface is of conventional streamlined aerofoil form, i.e. the generating line of this profile is rectilinear in a direction substantially parallel to the wing span and follows a path defined by the left-hand vertical profile of FIGS. 8–10. while the under surface has the evolute, concave profile hereinbefore described. As a result, for each wing compartment $56_1$, $56_2$ . . . the thickness of the profile varies, the thickest part being in front of the chord separating two adjacent compartments (section ij, FIGS. 8 and 12), while the thinnest part of the profile is at the central chord of each compartment (section op, FIGS. 11 and 12); this part of the wing comprising the ducts 8, precedingly described.

This modification makes it possible to accommodate the spars 38, 38' as well as ribs 58, 58', 58" supporting the skin of the profile, which may be of sheet metal, within the thickness of the wing.

As in the preceding embodiments, the streamlines on the under side are channelled by each compartment and a part of the air is blown at high speed from the under to the upper side, to supplement the airflow on the upper wing surface: which prevents breakaway at high incidence and controls the wing tip and trailing edge vortices.

The aeroplane wing in accordance with the present invention can be equally used with advantage for light aircraft with a low speed (FIGS. 1 and 3), and for high-speed aircraft with high wing loading, as shown for a jet aircraft 60 in FIG. 7. By means of such a wing, the under wing surface whereof has compartments or cells for drawing in the air flow, such aircraft retain a satisfactory lift at low speeds as well as high performance at all speeds, in particular owing to the suppression of parasitic vortices. Fast aircraft with short landing and takeoff runs can thus be constructed.

I claim:

1. An aeroplane wing which is divided in plan into a plurality of compartments of a simple geometrical form, ducts incorporated in the compartments directed towards the rear and producing a flow of accelerated air from the under surface to the upper surface, an evolute, concave aerodynamic profile in the under surface of each of the camportments, the concavity of the profile having a maximum at the central chord of the compartment and diminishing progressively towards the chords laterally bounding the said compartment, and a hollow, evolute transverse profile in the under surface in each compartment of the wing.

2. A wing as claimed in claim 1, wherein the ducts are arranged in the parts of the wing where the profile has the greatest concavity, that is in the middle region adjoining the central chord of each cell or compartment.

3. A wing as claimed in claim 2, which is formed of a thin material at least in its central part between the leading edge and the trailing edge, whereby in each compartment the profile of the upper wing surface is identical with the profile of the wing under surface, at least in the said central part.

4. An aeroplane wing which is divided in plan into a plurality of compartments of a simple geometrical form, ducts incorporated in the compartments directed towards the rear and producing a flow of accelerated air from the under surface to the upper surface, an evolute, concave aero-dynamic profile in the under surface of each of the compartments, the concavity of the profile having a maximum at the central chord of the compartment and diminishing progressively towards the chords laterally bounding the said compartment, and a hollow, evolute transverse profile in the undersurface in each compartment of the wing, said ducts being arranged in the parts of the wing where the profile has the greatest concavity, that is in the middle region adjoining the central chord of each cell or compartment, the generating line, of the profile of the upper surface in each compartment being rectilinear and substantially paralled to the span, whereby the profile of each compartment has a variable thickness, the thinnest part being at the central chord of the compartment in question.

5. A wing as claimed in claim 4, wherein the generating line of the profile of the upper surface of any two adjoining compartments is a straight line common to and substantially parallel to the span of both compartments.

6. An aeroplane wing which is divided in plan into a plurality of compartments of a simple geometrical form, ducts incorporated in the compartments directed towards the rear and producing a flow of accelerated air from the under surface to the upper surface, an evolute, concave aerodynamic profile in the under surface of each of the compartments, the concavity of the profile having a maximum at the central chord of the compartment and diminishing progressively towards the chords laterally bounding the said compartment, and a hollow, evolute transverse profile in the under surface in each compartment of the wing, the compartments having in plan any one of the shapes of the group comprising a rectangle, parallelogram, triangle, trapezoid and lozenge (rhomboid).

7. An aeroplane wing which is divided in plan into a plurality of compartments of a simple geometrical form, ducts incorporated in the compartments directed towards the rear and producing a flow of accelerated air from the under surface to the upper surface, an evolute, cancove aero-dynamic profile in the under surface of each of the compartments, the concavity of the profile having a maximum at the central chord of the compartment and diminishing progressively towards the chords laterally bounding the said compartment, and a hollow, evolute transverse profile in the under surface in each compartment of the wing, not less than one compartment being located at each wing tip with ducts and an under surface with a concave, evolute profile, the profile of the underside of the chords laterally bounding each compartment being rectilinear.

8. A wing as claimed in claim 7 wherein the entire surface of the wing is divided into adjoining compartments.

References Cited

UNITED STATES PATENTS 3,269,674   8/1966   Girard _____ 244
3,281,095  10/1966   Runge _____ 244—42

FERGUS S. MIDDLETON, *Primary Examiner.*

MILTON BUCHLER, *Examiner.*

T. MAJOR, *Assistant Examiner.*